United States Patent
Maruyama et al.

(10) Patent No.: US 10,477,094 B2
(45) Date of Patent: Nov. 12, 2019

(54) FOCUS DETECTION UNIT, IMAGE CAPTURING APPARATUS, AND FOCUS DETECTION METHOD

(71) Applicant: CANON KABUSHIKI KAISHA, Tokyo (JP)

(72) Inventors: Naoki Maruyama, Tokyo (JP); Seiya Ohta, Yokohama (JP); Ryo Kawasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 15/478,071

(22) Filed: Apr. 3, 2017

(65) Prior Publication Data

US 2017/0289438 A1    Oct. 5, 2017

(30) Foreign Application Priority Data

Apr. 5, 2016   (JP) .................................. 2016-075988
Feb. 1, 2017   (JP) ................................. 2017-017019

(51) Int. Cl.
*H04N 5/232*     (2006.01)
*G03B 13/36*     (2006.01)

(52) U.S. Cl.
CPC ......... *H04N 5/23212* (2013.01); *G03B 13/36* (2013.01)

(58) Field of Classification Search
None
See application file for complete search history.

(56) References Cited

U.S. PATENT DOCUMENTS

2008/0165274 A1 * 7/2008 Toguchi ................ G02B 7/023
                                                              348/354

FOREIGN PATENT DOCUMENTS

JP         10-51676 A     2/1998
JP         4641494 B2     3/2011

* cited by examiner

*Primary Examiner* — Mark T Monk
(74) *Attorney, Agent, or Firm* — Canon U.S.A., Inc., IP Division

(57) ABSTRACT

An image capturing apparatus includes an image capturing unit configured to capture an image focused on a light receiving surface, a gain unit configured to multiply a gain to an image signal output from the image capturing unit and be able to electronically change brightness of an image that the image signal represents, and a focus signal generating unit configured to extract a signal in a frequency band from the image signal output from the gain unit and generate a focus signal from the extracted signal. The focus signal generating unit changes the frequency band for the signal to be used in generating the focus signal in accordance with the magnitude of the gain.

5 Claims, 15 Drawing Sheets

FOCUS DETECTION UNIT, IMAGE CAPTURING APPARATUS, AND FOCUS DETECTION METHOD

BACKGROUND

Field of the Disclosure

The present disclosure relates to a focus detection unit, an image capturing apparatus including the focus detection unit, and a focus detection method.

Description of the Related Art

Conventionally, in an image capturing apparatus, an autofocus function (hereinbelow referred to as an AF) is known as a function to perform focus adjustment. In this AF technique, various methods such as a phase difference method and a contrast detection method are proposed.

For example, in the AF function in the contrast detection method, a value generated based on contrast of a high frequency component extracted from an image signal is used as an AF evaluation value. In a state in which an image is defocused, the contrast of the high frequency component (that is, the AF evaluation value) is low. As the image is further focused, the contrast of the high frequency component is higher. Thus, by adjusting a focus position so that the AF evaluation value may be the maximum, the image can be focused. This is how the AF function in the contrast detection method works.

Besides such a basic AF control method, Japanese Patent Publication No. 4641494 discloses a technique enabling improvement of focusing accuracy by generating a plurality of AF evaluation values in different frequency bands and, at the time of in-focus, using a signal of a higher frequency component than a frequency band normally used.

An auto exposure control function (AE) is generally used, in which, when a subject is dark in an image capturing environment, a gain is multiplied to an image signal to compensate for the darkness to keep an appropriate exposure level.

When the process of multiplying a gain when the subject is dark is performed in this manner, a noise is carried on the image signal, and a noise signal is thus superimposed on the high frequency component used for the AF evaluation value. This noise has a greater influence on the image signal as the gain to be multiplied is higher (high gain). Also, the noise signal generated by gain multiplication has a greater influence on the high frequency component than on the low frequency component.

SUMMARY

An image capturing apparatus according to the present disclosure includes an image capturing unit configured to capture an image focused on a light receiving surface, a gain unit configured to multiply a gain to an image signal output from the image capturing unit and be able to electronically change brightness of an image that the image signal represents, and a focus signal generating unit configured to extract a signal in a frequency band from the image signal output from the gain unit and generate a focus signal from the extracted signal. The focus signal generating unit changes the frequency band for the signal to be used in generating the focus signal in accordance with the magnitude of the gain.

Further features of the present disclosure will become apparent from the following description of exemplary embodiments (with reference to the attached drawings).

DESCRIPTION OF THE EMBODIMENTS

Preferred embodiments of the present disclosure will be described in detail with reference to the attached drawings.

As described above, the noise signal generated by gain multiplication has a greater influence on the high frequency component than on the low frequency component. Thus, when the high frequency component is actively used as described in Japanese Patent Publication No. 4641494, a noise component may be superimposed more easily, focusing accuracy may decrease further, and focus adjustment may be more difficult than in a case of not actively using the high frequency component.

In the present embodiments, an image capturing apparatus enabling a decrease of focusing accuracy to be alleviated and enabling focus adjustment to be facilitated under an environment in which a high gain is multiplied such as a dark image capturing condition will be described.

(First Embodiment)

An image capturing apparatus according to the present embodiment is an image capturing apparatus in which, at the time of an AF process and in-focus level determination, a component in a certain frequency band is extracted from an image signal, and an AF evaluation value generated with use of the extracted frequency component is used. In the apparatus, the frequency component for use in generating the AF evaluation value is changed in accordance with the magnitude of a gain. A high frequency component is more influenced by noises generated by multiplying the gain to the image signal than a low frequency component. Thus, when the gain is high, a signal in a lower frequency band than that when the gain is low is used to generate the AF evaluation value. Here, using the low frequency signal includes increasing the ratio of the low frequency signal. For example, using the low frequency signal includes, in a case in which a first frequency signal and a second frequency signal having higher frequency than the first frequency signal are synthesized to generate the AF evaluation value, increasing the ratio of the first frequency signal in a synthesis signal. Also, changing the frequency component includes changing the frequency itself of the component constituting the signal and changing the ratio of the components constituting the signal. Hereinbelow, the present embodiment will be described more specifically.

Figure 1:
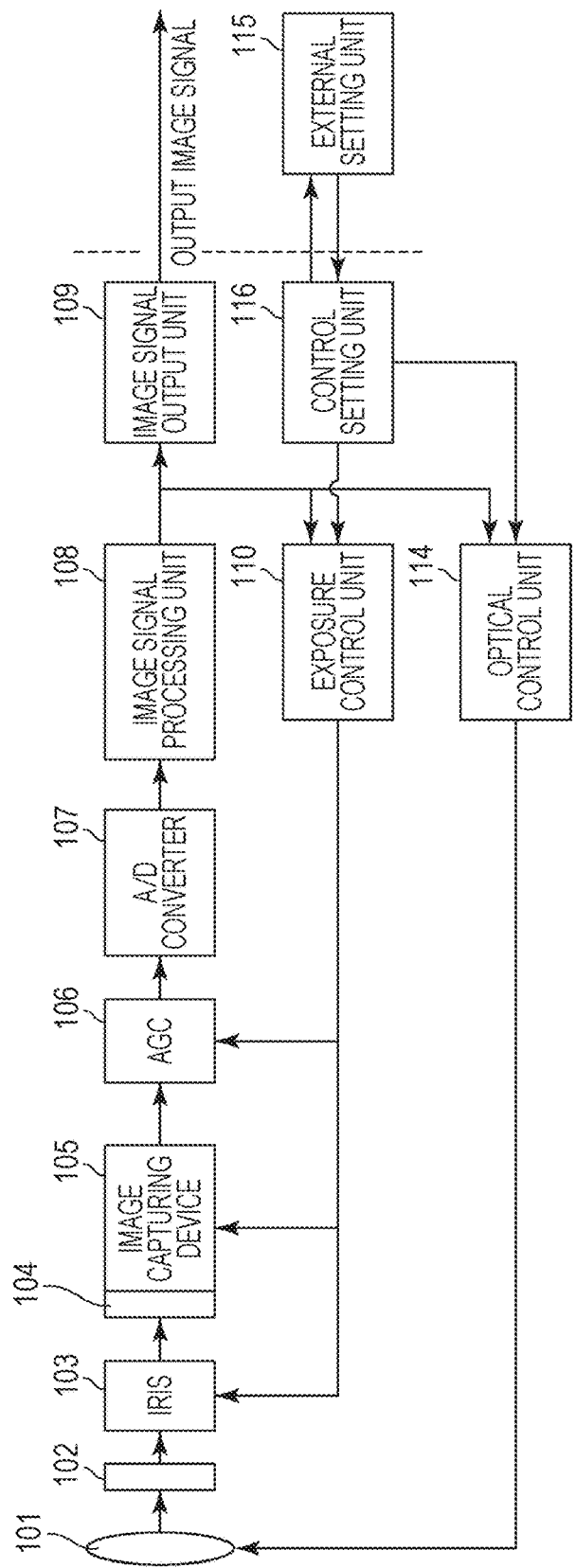
FIG. 1 illustrates a configuration example of an image capturing apparatus according to one or more aspects of the present disclosure.

FIG. 1 illustrates a configuration example of an image capturing apparatus according to the present embodiment. In FIG. 1, a lens group 101 is an optical system configured to collect incident light from a subject on an image capturing device 105. The lens group 101 includes a focus lens configured to focus the subject, a zoom lens configured to adjust a field angle, and the like. The lens group 101 may be integrated with the image capturing apparatus, or the lens group 101 and the image capturing apparatus may be separated from each other, and the lens group 101 that can be mounted may be configured to be replaceable. Also, an image to be captured may be a moving image or a still image.

Light that has entered a camera through the lens group 101 passes through an optical filter 102, and the light amount is adjusted in an iris 103 configured to adjust the light amount entering the image capturing device 105. A type of the optical filter 102 is not particularly limited, and an infrared cut filter (IRCF) can be used, for example.

Image information whose light amount has been adjusted in the iris 103 passes through color filters 104 arrayed in a predetermined order per pixel on a light receiving surface of the image capturing device 105 and is received in the image capturing device 105.

The image capturing device 105 is an image capturing unit and is configured to capture an image focused on the light receiving surface by the lens group 101 and output image information to be captured as an analog signal (image signal).

Luminance of an image represented by the image signal output from the image capturing device 105 is electronically controlled (gain control) by a gain unit (hereinbelow referred to as an AGC as well) 106. The AGC 106 multiplies a gain to the image signal output from the image capturing unit and can electronically change brightness of the image. The analog image signal output from the AGC 106 is converted into a digital signal in an A/D converter 107.

In an image signal processing unit 108, the digital image signal from the A/D converter 107 is subject to a predetermined process to cause a luminance signal and a chrominance signal to be output per pixel. The image signal processing unit 108 prepares an image for output and various parameters for camera control. Examples of the various parameters for camera control are a parameter for use in control of the iris, an AF evaluation value, which is a frequency component value for focus adjustment, and a parameter for use in white balance control for controlling a color tone. In the present disclosure, a signal of the AF evaluation value is referred to as a focus signal in some cases. In this manner, the image signal processing unit 108 can be referred to as a focus signal generating unit as well since the image signal processing unit 108 generates the focus signal. The image signal processing unit 108 can extract signals in a plurality of frequency bands from the image signal output from the image capturing device 105 and gain-controlled by the AGC 106. For example, the image signal processing unit 108 can extract a signal in a first frequency band and a signal in a second frequency band which is a higher frequency band than the first frequency band. As the signal in a frequency band, a signal of a pinpoint frequency component may be extracted and obtained. To extract a signal in a specified frequency band, a band pass filter can be used, for example.

An image signal output unit 109 outputs the image signal prepared in the image signal processing unit 108 to outside.

An exposure control unit 110 calculates luminance information in an image frame from luminance information output from the image signal processing unit 108 and controls the iris 103 and the AGC 106 to set brightness of the captured image to desired brightness. Also, by adjusting shutter speed, the accumulation period of the image capturing device 105 can be adjusted, and brightness can be adjusted.

Autofocus control (focus adjustment operation) is performed with use of a value of a high frequency component extracted from the image signal prepared in the image signal processing unit 108 as the AF evaluation value. Specifically, in the autofocus control, an optical control unit 114 controls the lens group 101 so that the AF evaluation value may be a maximum value to adjust a focus position. The optical control unit 114 is an optical control unit that can drive and control the focus lens included in the lens group 101 and has an autofocus function.

As described above, in the present embodiment, when a gain is high, a signal in a lower frequency band than that when the gain is low is used to generate the AF evaluation value. The frequency band to be used may be changed in a stepless manner in accordance with the magnitude of the gain or may be changed in a stepped manner. The stepped change includes two-step change. For example, when the gain is a certain value (threshold value) or higher, a signal in a first frequency band may be used, and when the gain is lower than the certain value, a signal in a second frequency band which is a higher frequency band than the first frequency band may be used.

An external setting unit 115 is a collective term for setting units for camera setting and is a unit for performing so-called general camera operations such as focus adjustment, brightness setting, and zoom magnification setting.

A control setting unit 116 is configured to actually execute a control command to the camera transmitted from the external setting unit and performs exposure control, lens control, and the like.

EXAMPLE 1

In the present example, as an example of the image capturing apparatus according to the first embodiment described above, an image capturing apparatus that performs an AF process with use of as an AF evaluation value a synthesis signal obtained by synthesizing a component in a first frequency band with a component in a second frequency band, which is a component in a higher frequency band than the first frequency band will be described. Under a high gain environment, the image capturing apparatus according to the present example obtains as the AF evaluation value a signal with low frequency obtained by increasing the ratio of the component in the first frequency band in the synthesis signal. In the present example described below, the component in the first frequency band is referred to as a low frequency component while the component in the second frequency band is referred to as a high frequency component.

Figure 2:
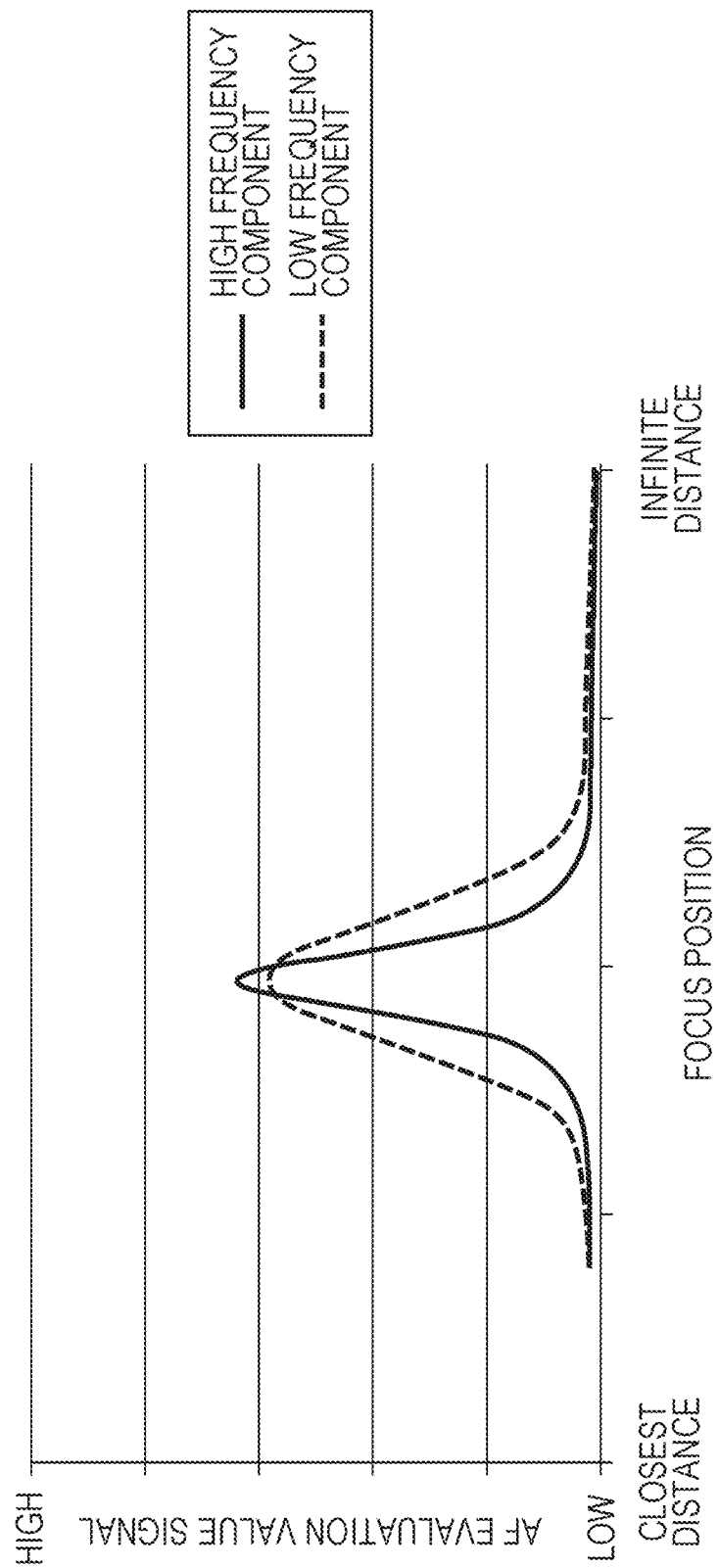
FIG. 2 illustrates AF evaluation values at the time of a low gain according to one or more aspects of the present disclosure.
Figure 3:
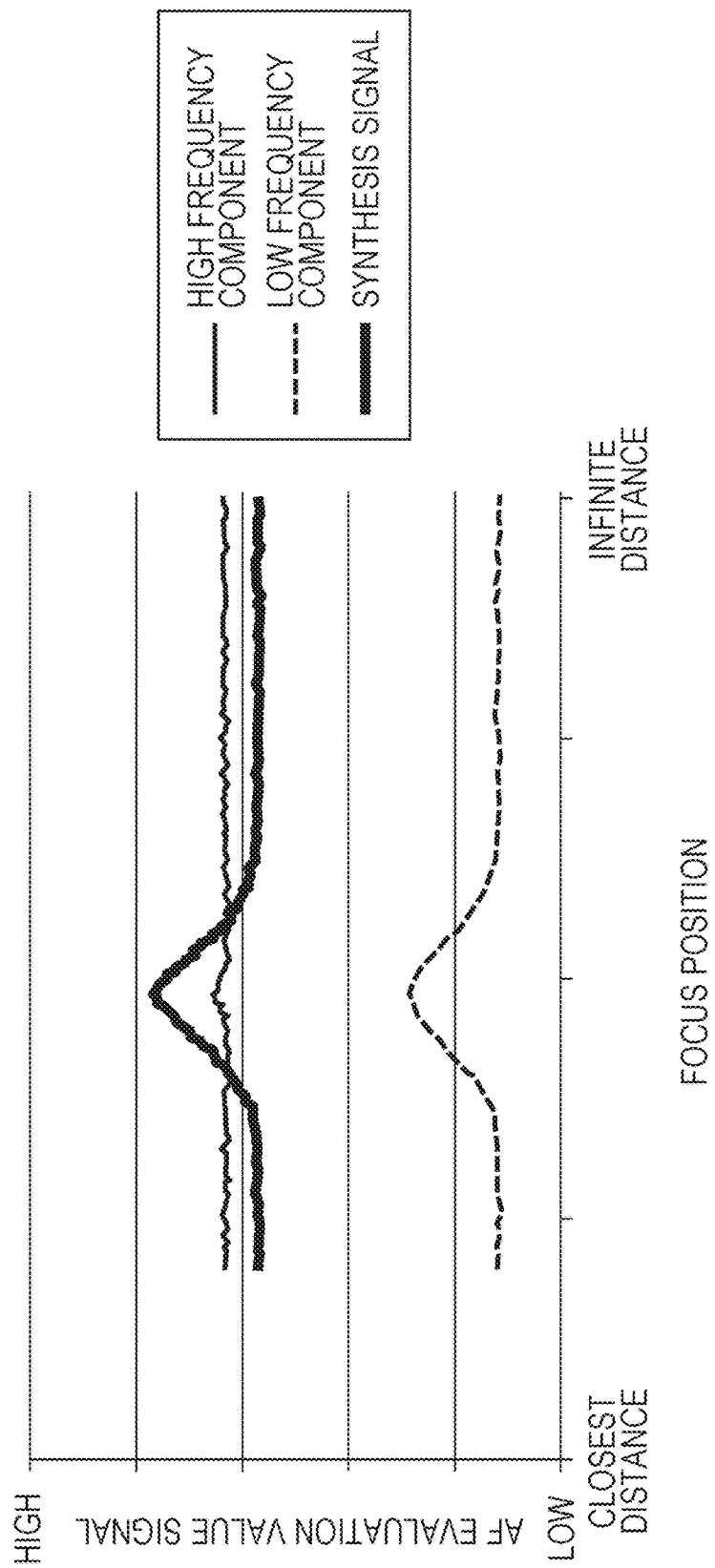
FIG. 3 illustrates the AF evaluation values at the time of a high gain according to one or more aspects of the present disclosure.

FIGS. 2 and 3 schematically illustrate examples of the AF evaluation values for components in respective frequency bands at the time of a low gain and a high gain. In each graph, the horizontal axis represents a focus position while the vertical axis represents the magnitude of the AF evaluation value serving as the focus signal. In each graph, AF evaluation value signals (each of which is signal intensity for each frequency component), obtained by starting moving the focus lens in a defocused state to reach a focused state and further moving the focus lens in the focused state to reach a defocused state, are plotted. In each graph, a focused position is a point at which the AF evaluation value signal is the highest.

As is apparent from FIG. 2, at the time of the low gain, both the components in the respective frequency bands have less noise components and produce clear waves of AF evaluation values.

However, as illustrated in FIG. 3, at the time of the high gain, the noise components influence each of the AF evaluation values, each of the AF evaluation values is entirely offset, and the peak is crushed. Especially, the AF evaluation value with high frequency (solid line in FIG. 2 or 3), which easily picks up noise components, is significantly influenced by the noise components. Conversely, it is apparent that the AF evaluation value with low frequency (dashed line in FIG. 2 or 3) is less influenced by the noises than the signal in the high frequency component.

In a case in which the AF evaluation value with high frequency is used at the time of such a high gain, the signal buried in the noises will be used. This causes a problem in which a defocused state is kept, and in which the peak of the focusing cannot be found.

As described above, the high frequency component is characterized by being advantageous in focus adjustment and being more influenced by noises. On the other hand, the low frequency component is characterized by being disadvantageous in focus adjustment and being less influenced by noises.

Under such circumstances, in the present example, the ratio of frequency bands to be used in generating the AF evaluation value is changed in accordance with the magnitude of the gain. Accordingly, focus adjustment can be performed in a favorable manner both under a low gain environment and under a high gain environment.

A synthesis signal illustrated in FIG. 3 is obtained by mixing and synthesizing the high frequency component with the low frequency component. By using the mixed synthesis signal as the AF evaluation value, the peak can be produced even under the high gain environment, under which the peak of the AF evaluation value is not produced well in a case in which the high frequency component is used as the AF evaluation value, and an accuracy decrease in the AF process can be alleviated.

Further, the peak of the evaluation value is not produced well when only the low frequency component is used. However, by using not only the low frequency component but also the high frequency component, the peak of the evaluation value is produced around a peak position for the high frequency component, and accuracy of an in-focus position can be increased.

On the other hand, at the time of the low gain, in a case in which the synthesis signal is used in a state in which the ratio of the low frequency component is high as illustrated in FIG. 2, a wide peak is produced around a best focus position (also referred to as an in-focus position), which may cause defocusing. Accordingly, at the time of the low gain, the ratio of the high frequency component in the synthesis signal is increased further than at the time of the high gain.

Figure 4:
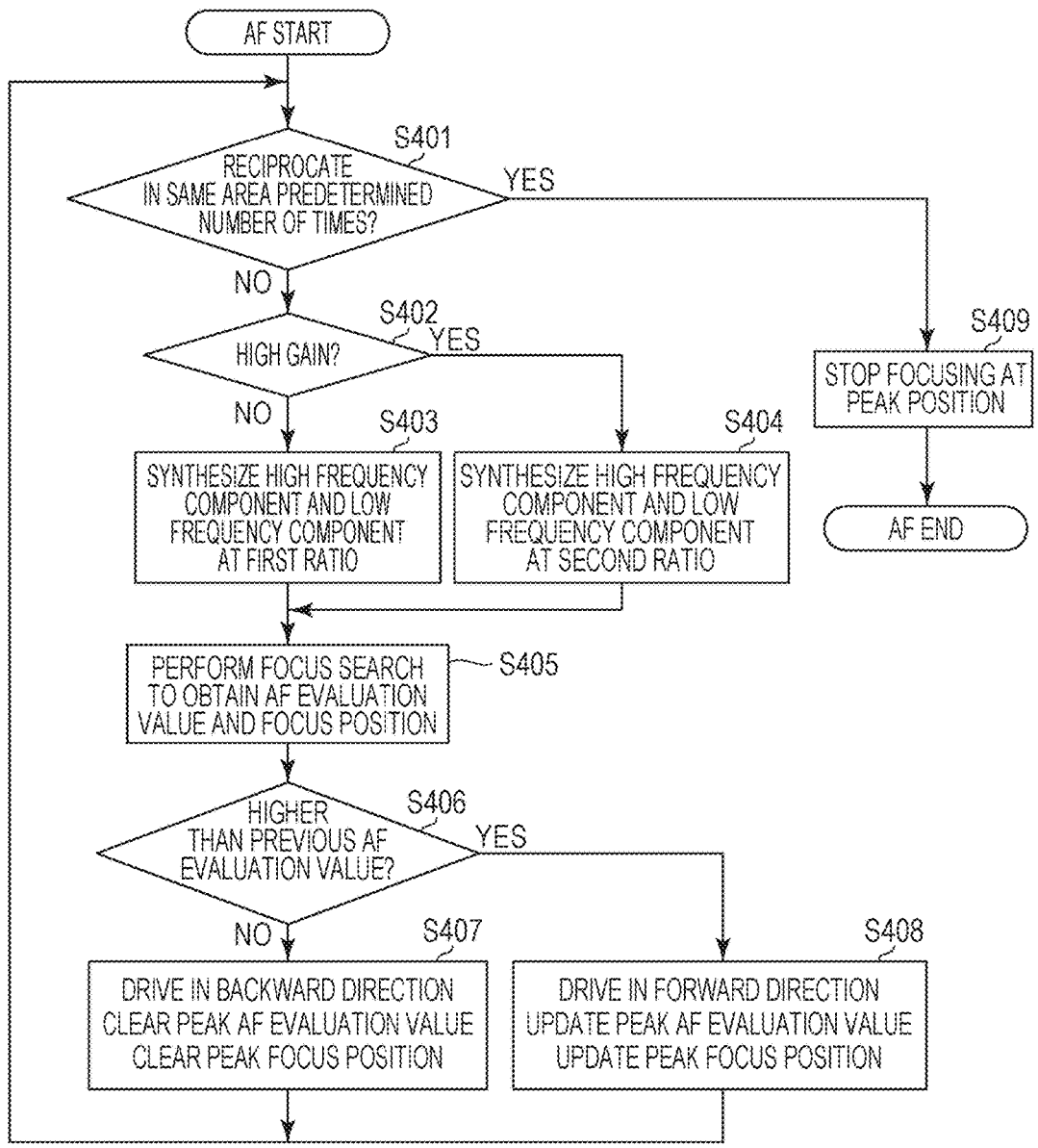
FIG. 4 illustrates an AF process example according to Example 1.

Based on the above description, an example of a basic operation of the AF function will be illustrated in FIG. 4.

First, it is determined in step S401 whether or not the focus lens stays in the same area a predetermined number of times. This is determination that the best focus position is in the area in a case in which the focus lens keeps staying in the same focus area. Since the determination in step S401 is not passed in the beginning of the AF operation, the procedure moves to the next step.

In step S402, it is determined whether or not the current image capturing state is in a high gain state. In the case of the high gain, the image signal will be influenced by noises as described above. Thus, in the present example, a method for generating an AF evaluation value signal for use in focus adjustment (the ratio of respective frequency components) is changed based on the magnitude of the gain.

When the state is not in the high gain state, the AF evaluation value signal is generated based on a synthesis signal obtained by synthesizing the low frequency component with the high frequency component at a first ratio (S403). Conversely, when the state is in the high gain state, the AF evaluation value signal is generated based on a synthesis signal obtained by synthesizing the low frequency component with the high frequency component at a second ratio (S404). Note that the first ratio is a ratio at which the ratio of the high frequency component is higher than that at the second ratio. Thus, in step S404, the AF evaluation value signal is generated so that the ratio of the low frequency component may be higher than that in step S403. At this time, at the first ratio, the ratio of the high frequency component is preferably equal to or higher than the ratio of the low frequency component, and at the second ratio, the ratio of the high frequency component is preferably lower than the ratio of the low frequency component.

A focus search is performed with use of the AF evaluation value signal generated in step S403 or S404 (S405). In the focus search, a focus position is moved by driving the focus lens, and information on the focus position and an AF evaluation value at the focus position are sequentially obtained. During the focus search, each time an AF evaluation value that is being searched is obtained, it is determined whether or not the AF evaluation value obtained this time is higher than an AF evaluation value obtained previously (S406). In a case in which the AF evaluation value increases in the focus search, this means that a current drive direction will lead to the best focus position. In this case, the focus lens included in the lens group is moved in a forward direction, the AF evaluation value and the focus position that are being held are updated as current values and are held as a tentative peak value and a tentative peak position of the AF evaluation value (S408). Conversely, in a case in which the AF evaluation value obtained this time is lower than the previous AF evaluation value, it is determined that the focus lens has receded from the best focus position. In this case, the focus lens is moved in a backward direction of the current moving direction, and along with the reversal of the moving direction, the AF evaluation value and the focus position that are being held are cleared (S407).

Thereafter, the procedure returns to step S401 again. By repeating steps S401 to S408, the peak position of the AF evaluation value can be detected. In a case in which it has been determined in step S401 that the focus lens stays in the same area a predetermined number of times, it is assumed that a peak value exists in the AF evaluation values that have already been obtained, a peak value and a peak position of the AF evaluation value that are being held are regarded as a final peak value and a final peak position, and detection of the peak position of the AF evaluation value is ended. Focusing is stopped at the peak position to complete a sequence of operations (S409).

Here, as an example, the case in which the ratio of frequency components to be used is changed in accordance with the gain has been described. However, a similar effect can be achieved not only by changing the ratio of frequency components but also by changing a frequency band itself to be used. In this case, similarly to the above case of changing the ratio, a lower frequency band is preferably used as the gain is higher.

Also, in a case in which the AF evaluation value is generated with use of a single frequency band, the signal in the frequency band may be converted into a signal in a lower frequency band.

Further, when focusing is stopped at a focus position in the final operation of the AF illustrated in step S409 in FIG. 4, a peak position may be detected again with use of the AF evaluation value signal having a higher frequency component than that when the focus search operation is performed in step S405 or the AF evaluation value signal in which the ratio of the high frequency component is high, and a detected peak position may be regarded as a final peak position.

The reason for this is that, as illustrated in FIG. 2, the signal of the low frequency component is more gentle around the peak position than the signal of the high frequency component, and that, when only the low frequency signal is relied on, focusing may be stopped at a position away from the best focus position.

Accordingly, in the coarse search (S402 to S408) for searching a best focus position neighborhood (in-focus position neighborhood), the focus lens is led to a peak position neighborhood with use of the low frequency component. Finally, an in-focus position (in-focus stop position) at which focusing is finally stopped is detected with use of the high frequency component, in which a peak of the AF evaluation value is produced more easily in the coarse search area. In this manner, the respective positions are preferably derived by changing the frequency component to be used.

On the other hand, in a case in which focus adjustment is performed with use of the high frequency component in the high gain state, a peak of the signal of the high frequency component may be buried in noises. When a signal of the same frequency component as that in the low gain state is used, or the high frequency component and the low frequency component are synthesized at an equal ratio, the noise component may be dominant, and the focusing accuracy may be lowered.

For this reason, in a case in which a peak position is detected again in step S409, at the time of a high gain, it is preferable to use the low frequency component to match the gain. Thus, when the gain is not a high gain, the AF evaluation value for use at the time of the final operation (S409) may be obtained from a higher frequency signal than that at the time of the focus search (S405), and when the gain is a high gain, the AF evaluation value may be obtained from the same frequency component signal both at the time of the focus search and at the time of the final operation. Also, even in a case in which, when the gain is a high gain, a higher frequency component signal is used at the time of the final operation (S409) than that at the time of the focus search (S405), it is preferable to use a higher frequency component signal at the time of the final operation when the gain is not a high gain than that when the gain is a high gain. In other words, it is preferable to change a frequency band to be used in generating the focus signal in accordance with the gain in step S409. In this case, in a case of the high gain, the same frequency signal as that in step S404 or an in-focus signal generated at the frequency ratio used in step S404 is used. In a case other than the high gain, a frequency signal or an in-focus signal in a higher frequency band than that in step S403 is used. Thus, the difference between the frequency bands in step S409 is more significant than the difference between the frequency bands in step S403 or S404.

In a case in which a peak position is detected again in step S409, it is preferable to obtain the AF evaluation values at finer focus position intervals than those at the time of the focus search to detect a peak position accurately and stop focusing. Detecting a peak position again in step S409 corresponds to minute driving and a peak position obtaining process using a minute driving result in Example 3 described below and will be described in detail in Example 3.

According to the present example, since the AF operation can be performed by alleviating the influence of noises even under the high gain environment, a decrease of focusing accuracy can be alleviated.

EXAMPLE 2

In the present example, a case in which an in-focus level is determined from the captured image with use of the focus signal (AF evaluation value) generated in the focus signal generating unit will be described.

Figure 5:
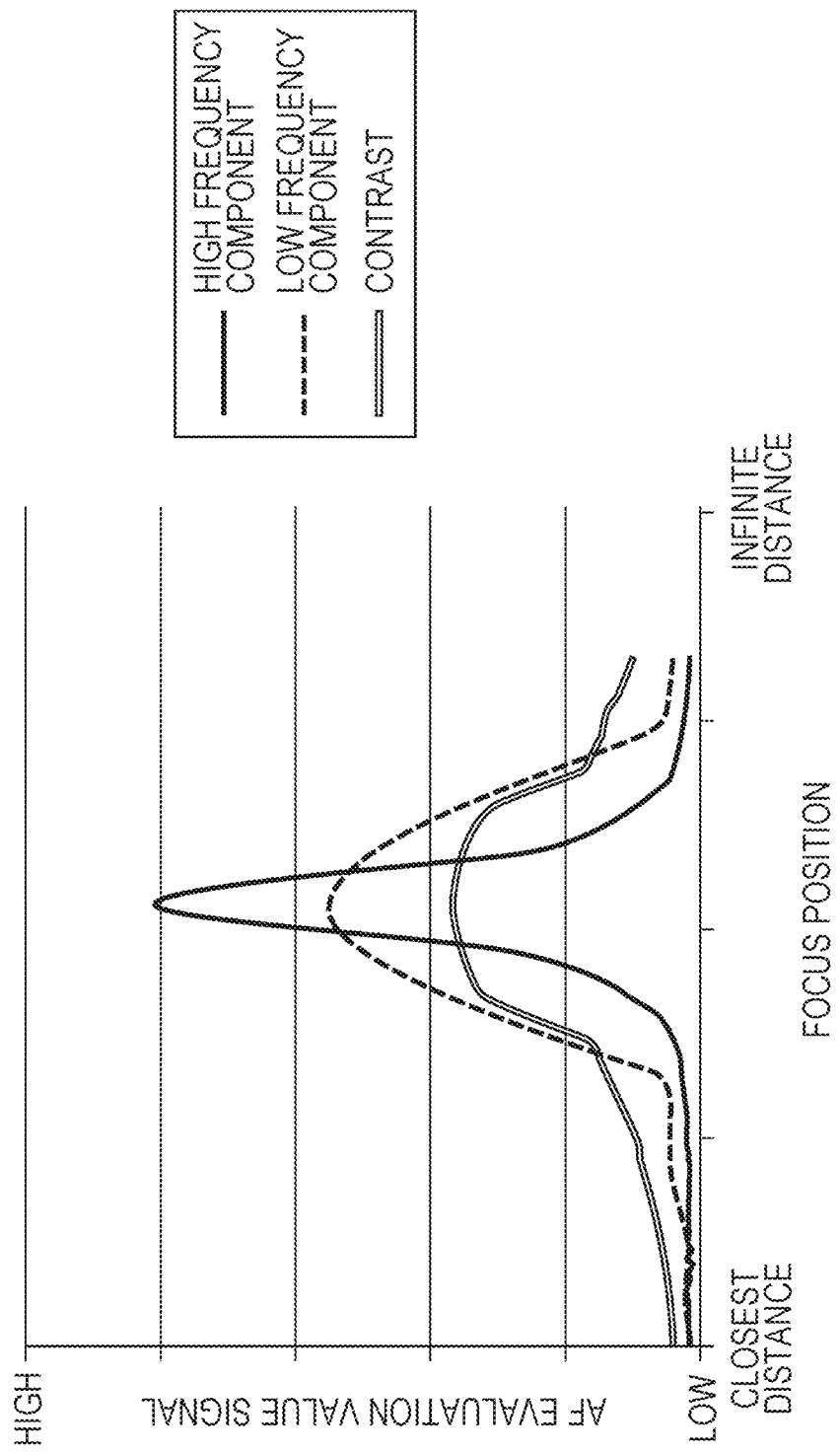
FIG. 5 illustrates the AF evaluation values and contrast at the time of the low gain according to one or more aspects of the present disclosure.

FIG. 5 illustrates an example of relationship between a focus position and an evaluation value.

It is generally known that there is correlation between a point at which contrast is the highest and a focus position.

When an image is defocused, the image in which an edge of a subject does not appear, and in which the subject has no boundary with a peripheral subject and is mixed with the peripheral subject is produced. Thus, the image with no contrast is produced. On the other hand, when an image is focused, an edge of a subject appears clearly, and the image in which the contrast of the subject is high is produced.

In this manner, based on the contrast state, it can be estimated whether or not the focus lens exists around the in-focus position depending on how high AF evaluation value signal is detected.

For example, it can be conceived that a determination value used to determine how high AF evaluation value needs to be detected is stored as data in accordance with a contrast value and that it is determined that the focus lens is around the in-focus position when this determination criterion is exceeded.

FIG. 5 illustrates an example thereof. FIG. 5 illustrates a contrast value and values having respective frequency components (a high frequency component and a low frequency component), which are AF evaluation values. A peak position of the AF evaluation value having each frequency component represents the best focus position. The contrast value is the highest around the focus peak position, which shows relationship between the focus position and the contrast. By performing this in-focus level determination appropriately, the focus lens is moved much in a defocused area while the focus lens is moved minutely around an in-focus area, which enables focusing time to be shortened and enables focusing performance to be improved.

When the high frequency component is used, this in-focus level determination can be performed accurately. That is, when the high frequency component signal and the low frequency component signal are compared, in a defocused state, the higher the frequency component is, the lower signal is detected, and around the best focus position, a large amount of the high frequency component tends to be carried on the image itself. Accordingly, the higher frequency band component the evaluation value has, the more steeply the peak of the evaluation value stands. Thus, using the high frequency band component facilitates clear determination of whether the image is defocused or focused.

As is apparent from FIG. 5, the AF evaluation value having the low frequency component has a more gentle peak than the AF evaluation value having the high frequency component has, and the AF evaluation value having the high frequency component can narrow down the focus area around the in-focus position more accurately.

Figure 6:
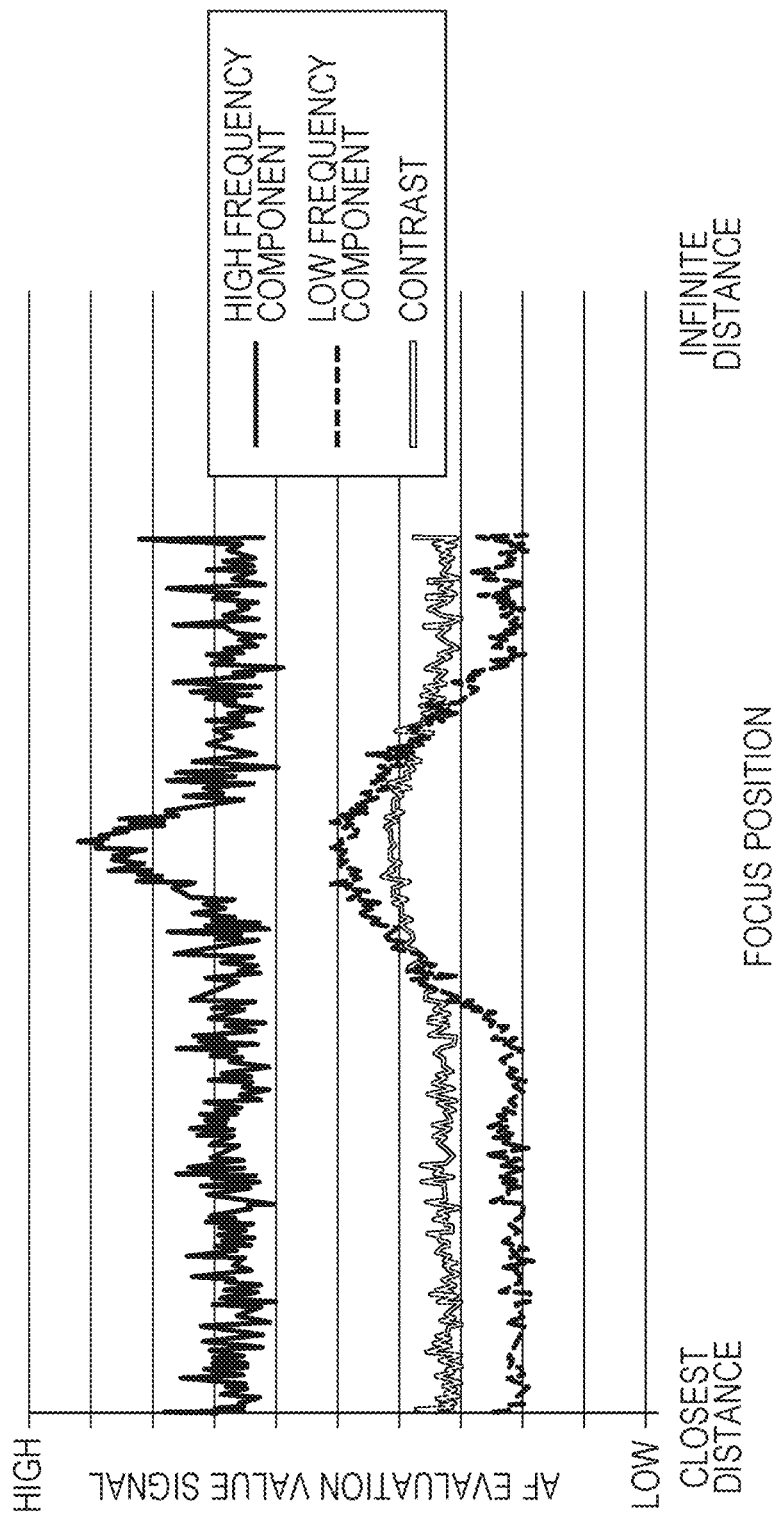
FIG. 6 illustrates the AF evaluation values and the contrast at the time of the high gain according to one or more aspects of the present disclosure.

On the other hand, a state of a focus position and an evaluation value in a high gain state is illustrated in FIG. 6.

In a case in which an image is dark, and a gain is multiplied to a luminance signal of the image to brighten the image, the peak of the high frequency component signal will not be produced as described in Example 1, which makes it difficult to perform correct in-focus determination.

Also, since the high frequency component itself appears as a high value due to an influence of noises, the high frequency component signal appears as a high value from a noise signal even in an area in which contrast does not appear well. When the appearing high frequency component signal exists around the in-focus position, erroneous determination is performed easily.

Under such circumstances, the present example considers the noise amount to be superimposed in accordance with a gain and proposes changing of the ratio between frequency components to be synthesized in accordance with the gain for the AF evaluation value signal, which is a synthesis signal in a plurality of frequency bands that determines the in-focus level.

By doing so, as described in Example 1, the influence of noises, which the high frequency component is poor at dealing with, can be alleviated.

As illustrated in FIG. 6, by performing in-focus determination with use of the low frequency component based on an in-focus determination threshold value set in accordance with a contrast value (contrast in FIG. 6), a situation in which using the high frequency component hinders the in-focus level determination can be improved.

On the other hand, when the in-focus level determination is performed with use of the low frequency component at all times, an area determined as an in-focus position will increase further than when the high frequency component is used. Thus, accuracy of the determination will decrease.

To consider such a characteristic, the ratio of the low frequency component in the evaluation value signal needs to be changed in accordance with the gain.

Figure 7:
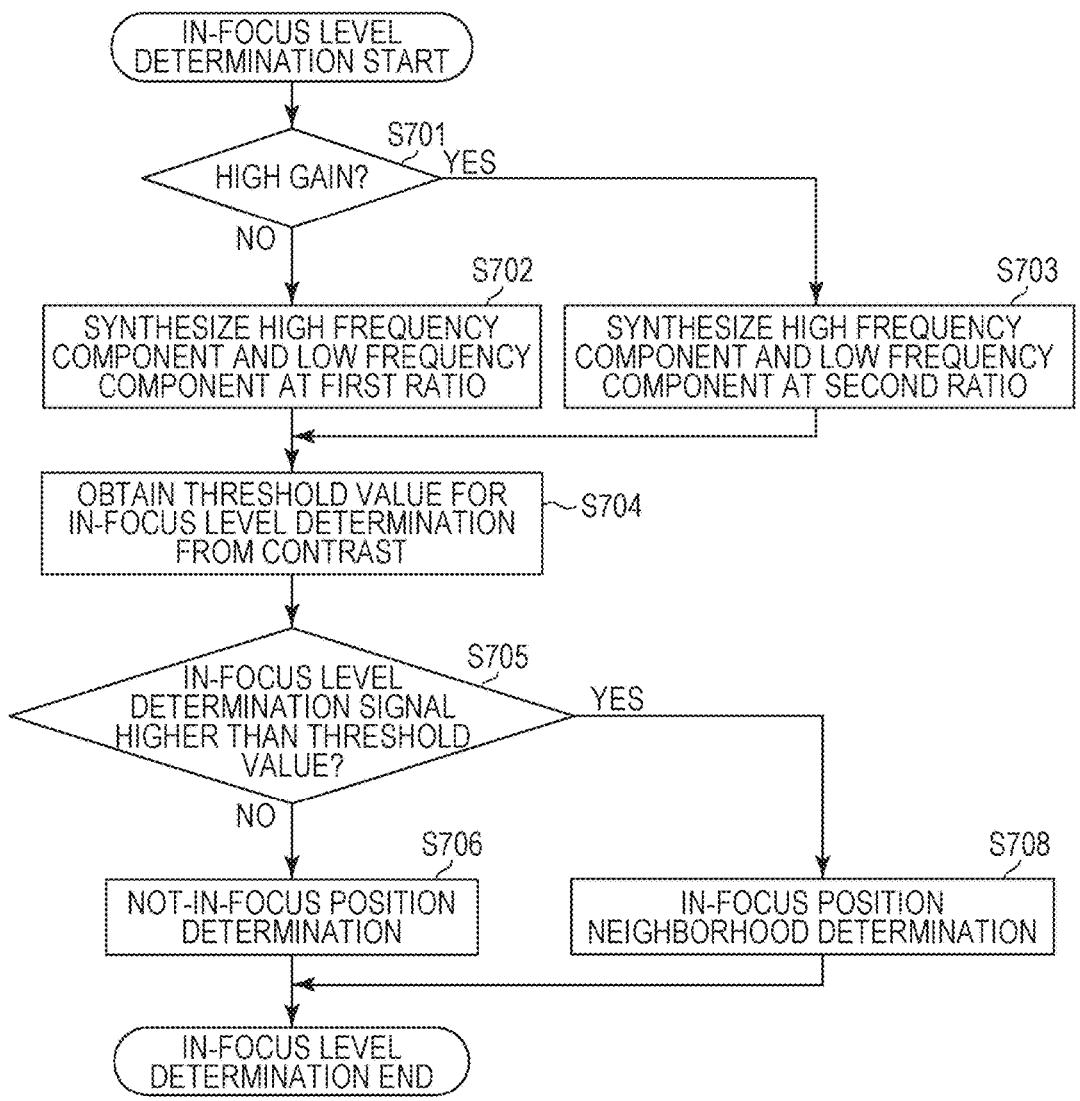
FIG. 7 illustrates an in-focus determining process according to Example 2.

Based on the above description, FIG. 7 illustrates an example of a basic operation for determining an in-focus level. In step S701, it is determined whether or not the current image capturing state is in a high gain state.

In the case of the high gain, the image signal will be influenced by noises as described above. Here, a frequency signal to be used in the in-focus level determination is determined from the magnitude of the gain.

When the state is not in the high gain state, the AF evaluation value signal is generated based on a synthesis signal having the high frequency component much (a signal obtained by synthesizing the low frequency component with the high frequency component at a first ratio) (S702). Conversely, when the state is in the high gain state, the AF evaluation value signal is generated based on a synthesis signal in which the ratio of the low frequency component is higher than that in step S702 (a signal obtained by synthesizing the low frequency component with the high frequency component at a second ratio) (S703).

Subsequently, in step S704, a threshold value for use in in-focus determination (referred to as an in-focus determination threshold value) is obtained from contrast of the image. A threshold value corresponding to a contrast value may be stored in advance, and another threshold value corresponding to another contrast value may be obtained as needed. With reference to a reference threshold value, a correction value in accordance with a contrast value may be used. A threshold value may be calculated with use of a calculation formula and a contrast value.

An in-focus level determination signal generated in step S702 or S703 is compared with the in-focus determination threshold value calculated in step S704 to determine a current in-focus level (S705).

In a case in which the in-focus level determination signal is lower than the threshold value, it is determined that the focus lens does not exist around the in-focus position but exists in a not-in-focus position (S706).

Conversely, in a case in which the in-focus level determination signal is higher than the threshold value, it is determined that the focus lens exists in an in-focus position neighborhood (S708).

Here, as an example, the case in which the ratio of frequency components to be used is changed in accordance with the gain has been described. However, similarly to Example 1, a similar effect can be achieved not only by changing the ratio of frequency components but also by changing a frequency band itself to be used. In this case, similarly to the above case of changing the ratio, a lower frequency band is preferably used as the gain is higher. Also, the in-focus level determination may be performed with use of a single frequency band, and the signal in the frequency band may be converted into a signal in a lower frequency band.

Also, similarly to the in-focus level determination signal, the threshold value for use in the in-focus level determination described in the present example is preferably set based on at least one or more conditions out of the magnitude of the gain at the time of determination, the frequency to be used, and the ratio of the frequency to be used.

Also, in a case in which absolute values of the respective frequency components themselves are different, the frequency components are preferably normalized and used, or the in-focus determination threshold value itself is also preferably normalized to correspond to the determination signal.

By performing the aforementioned process, favorable in-focus determination can be performed even at the time of the high gain.

(Second Embodiment)

In the present embodiment, an image capturing apparatus in which a gain changes during an AF operation including a stability determining unit configured to determine whether or not the gain is stable and a peak position detecting unit configured to obtain a peak position with use of a determination result provided by the stability determining unit and an AF evaluation value will be described. In the image capturing apparatus according to the present embodiment, an optical control unit controls a position of a focus lens based on a detection result of the peak position detecting unit so that a focus position may be close to a peak position to enable focus adjustment.

When a gain to be multiplied to an image signal is high, and a noise signal to be superimposed is high, an AF evaluation value tends to be high (refer to FIGS. 2 and 3). This may cause a problem in an AF operation. For example, in a case of an image capturing apparatus in which the gain can change during the AF operation, erroneous determination in which a focus position when the gain is high is an in-focus position may be performed, which may cause a problem of defocusing. Under such circumstances, the peak position detecting unit according to the present embodiment detects a peak position with use of the AF evaluation value generated by using a signal output from the AGC 106 after the gain is stable based on the determination result by means of the stability determining unit. By doing so, such a problem can thus be alleviated, and focusing accuracy can be improved. Meanwhile, time lag due to determination by means of the stability determining unit, A/D conversion, and the like can almost be ignored. Thus, in the present embodiment, a digital image signal obtained after the stability determining unit has determined that the gain is stable is regarded as an image signal obtained by the image capturing device after the stability determining unit has determined that the gain is stable. Hereinbelow, the present embodiment will be described more specifically.

A configuration example of the image capturing apparatus according to the present embodiment is similar to that in FIG. 1 described in the first embodiment, and description thereof is thus omitted. However, unlike the first embodiment, a frequency band to be used in generating an AF evaluation value is not changed in accordance with a gain. Accordingly, since AF evaluation values do not need to be obtained from signals in a plurality of frequency bands, the image signal processing unit 108 has only to extract a signal in one frequency band from an image signal and does not need to extract signals in a plurality of frequency bands. A flow of AF in the image capturing apparatus according to the present embodiment will be described more in detail in the following examples.

EXAMPLE 3

In the present example, a process for obtaining a peak position of an AF evaluation value after a gain is stable will be described more in detail.

Figure 8A:
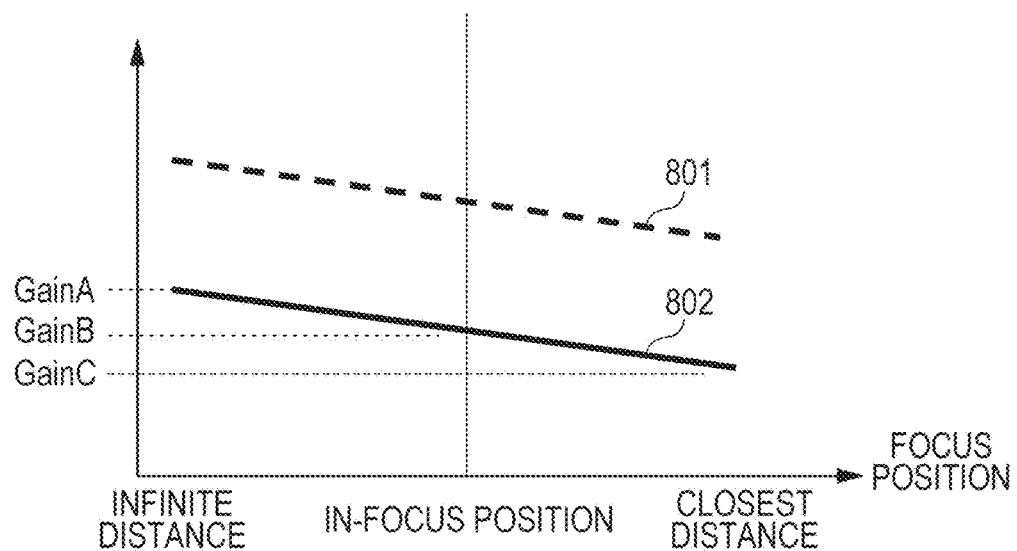
FIG. 8A is a graph illustrating relationship between an F number and a gain in each focus position under a low light intensity environment according to one or more aspects of the present disclosure.
Figure 8B:
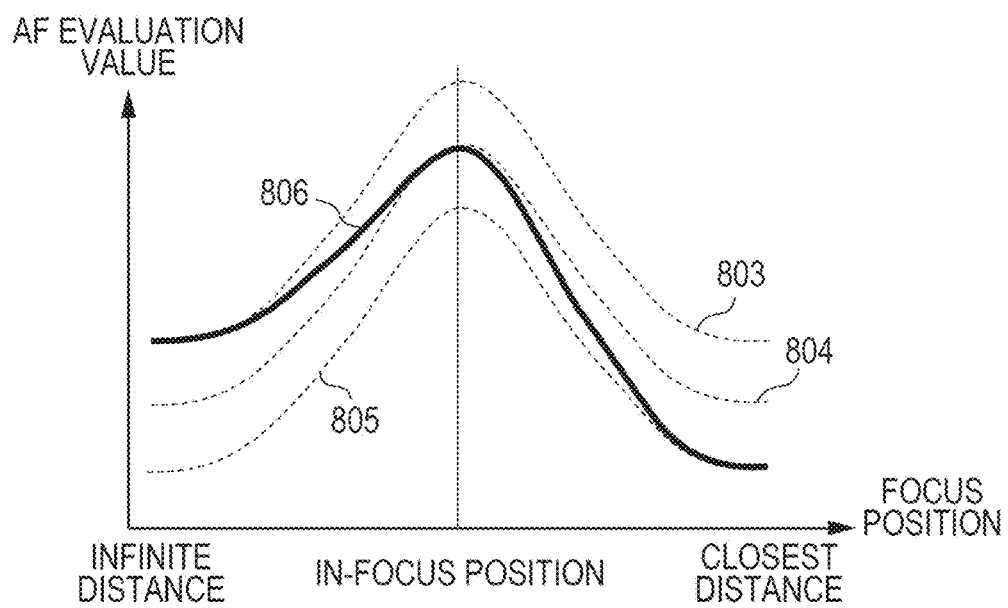
FIG. 8B is a graph illustrating relationship between the gain and the AF evaluation value in each focus position under the low light intensity environment according to one or more aspects of the present disclosure.

With reference to FIGS. 8A and 8B, relationship among an F number, a gain, and an AF evaluation value in each focus position under a low light intensity environment will be described. FIG. 8A illustrates relationship between the F number and the gain in each focus position. In FIG. 8A, an F number 801 is characterized by being higher when the focus position is further on an infinite distance side and being lower when the focus position in further on a closest distance side due to a lens characteristic. The light amount incident in the image capturing device changes due to the change of this F number 801. However, an AE function acts, and exposure is controlled to keep brightness. Under the low light intensity environment, since it is assumed that the iris is opened, and that the shutter speed is lowered to the limit, a gain 802 is controlled at this time. That is, the gain 802 is higher when the focus position is further on the infinite distance side and is lower when the focus position in further on the closest distance side. In this case, a gain value on the infinite distance end is referred to as GainA, a gain value in the in-focus position is referred to as GainB, and a gain value on the closest distance end is referred to as GainC.

FIG. 8B illustrates relationship between the gain and the AF evaluation value in each focus position. FIG. 8B illustrates an AF evaluation value 803 in a case in which the gain value is fixed to GainA, an AF evaluation value 804 in a case in which the gain value is fixed to GainB, and an AF evaluation value 805 in a case in which the gain value is fixed to GainC. As the gain is higher, and a noise signal is further superimposed on a high frequency component, the AF evaluation value tends to be higher. Thus, in the same focus position, magnitude relationship, "AF evaluation value 803 of GainA>AF evaluation value 804 of GainB>AF evaluation value 805 of GainC" is established. An example of the AF evaluation value in a case in which the gain changes due to the AE function is expressed as an AF evaluation value 806. For example, the AF evaluation value in a case in which the focus lens is driven from the infinite distance end to the closest distance end gradually changes in the order of the AF evaluation value of GainA, the AF evaluation value of GainB, and the AF evaluation value of GainC as the AF evaluation value 806.

Next, a problem to be solved by the present example will be described in detail with reference to FIGS. 13 to 15B.

Figure 13:
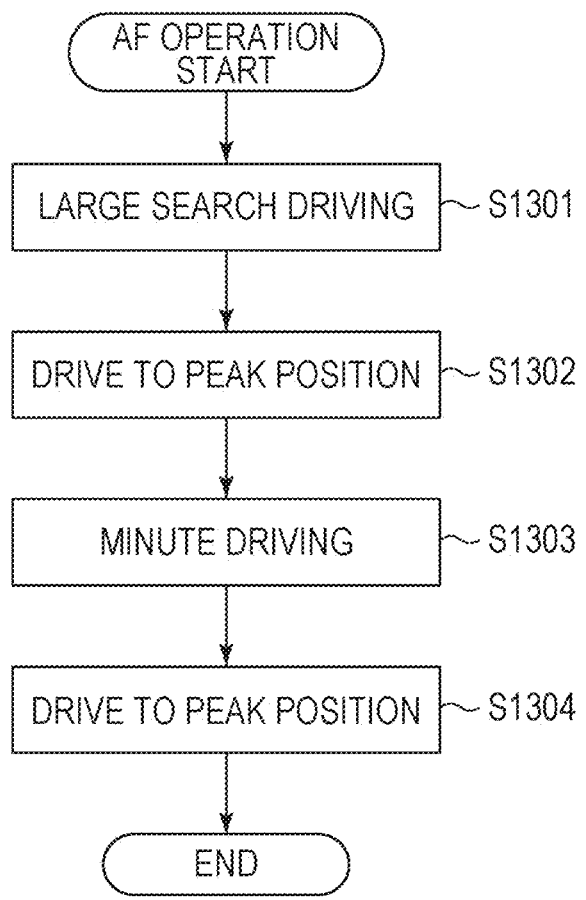
FIG. 13 is a flowchart of an AF basic operation according to one or more aspects of the present disclosure.

FIG. 13 illustrates a simple flow of the AF operation. First, in step S1301, large search driving is performed. The large search driving is driving in which the AF evaluation value in each focus position is obtained while the focus lens is significantly driven to search a peak position of the AF evaluation value.

Since the peak position is searched coarsely at high speed in the large search driving, the peak position searched in the large search driving is an approximate position. Subsequently, in step S1302, the focus lens is driven at high speed to the peak position detected in the large search driving in step S1301. In step S1303, minute driving is thereafter performed to detect a peak position. In the minute driving, the AF evaluation value in each focus position is obtained while the focus lens is minutely driven to search a peak position of the AF evaluation value. Thus, the peak position obtained in the minute driving is more accurate than the peak position obtained in the large search driving. The peak position obtained in this step is regarded as a final peak position, and the focus position is adjusted. In step S1304, the focus lens is driven to the peak position detected in the minute driving in step S1303, and the AF operation is ended. Meanwhile, it is preferable to generate the AF evaluation values with use of a higher frequency component in the minute driving than that in the large search driving.

An example of an AF operation problem caused by the aforementioned relationship between the gain and the AF evaluation value in this AF operation will be described with reference to FIGS. 14A to 15B.

Figure 14A:
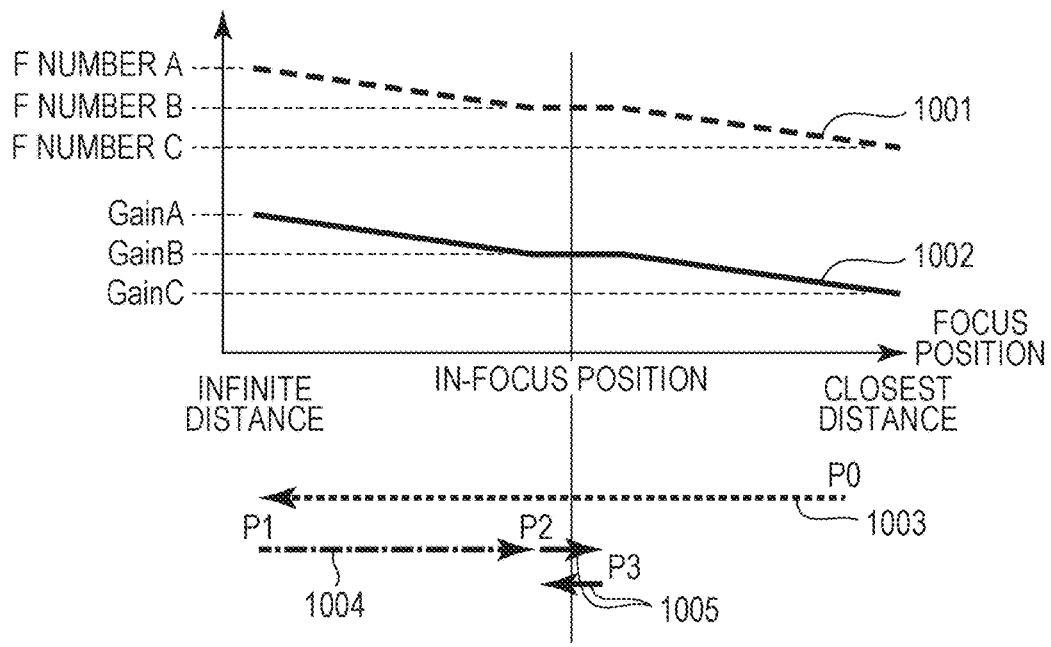
FIG. 14A is a graph illustrating relationship between the F number and the gain in each focus position according to one or more aspects of the present disclosure.

In the upper part of FIG. 14A, an F number 1001 and a gain 1002 at each focus position are shown in a similar manner to FIG. 8A. As for the F number 1001 and the gain value 1002, the F number and the gain value in the infinite distance end are F number A and GainA, respectively, the F number and the gain value in the in-focus position are F number B and GainB, respectively, and the F number and the gain value in the closest distance end are F number C and GainC, respectively. Also, the scale of only the area around the in-focus position is enlarged for detailed description. In the lower part of FIG. 14A, an example of driving for searching the in-focus position from step S1301 to S1303 in FIG. 13 is shown. First, A position P0 is set as a focus position at the time of the AF operation start. In step S1301, the large search driving (arrow 1003) is performed from the position P0 to a position P1 to coarsely detect a peak position. Subsequently, in step S1302, high-speed driving is performed to reach a position P2, which is the peak position detected in the large search driving (arrow 1004). Thereafter, in step 51303, the minute driving (arrows 1005) is performed from the position P2 to a position P3 to detect a peak position.

Figure 14B:
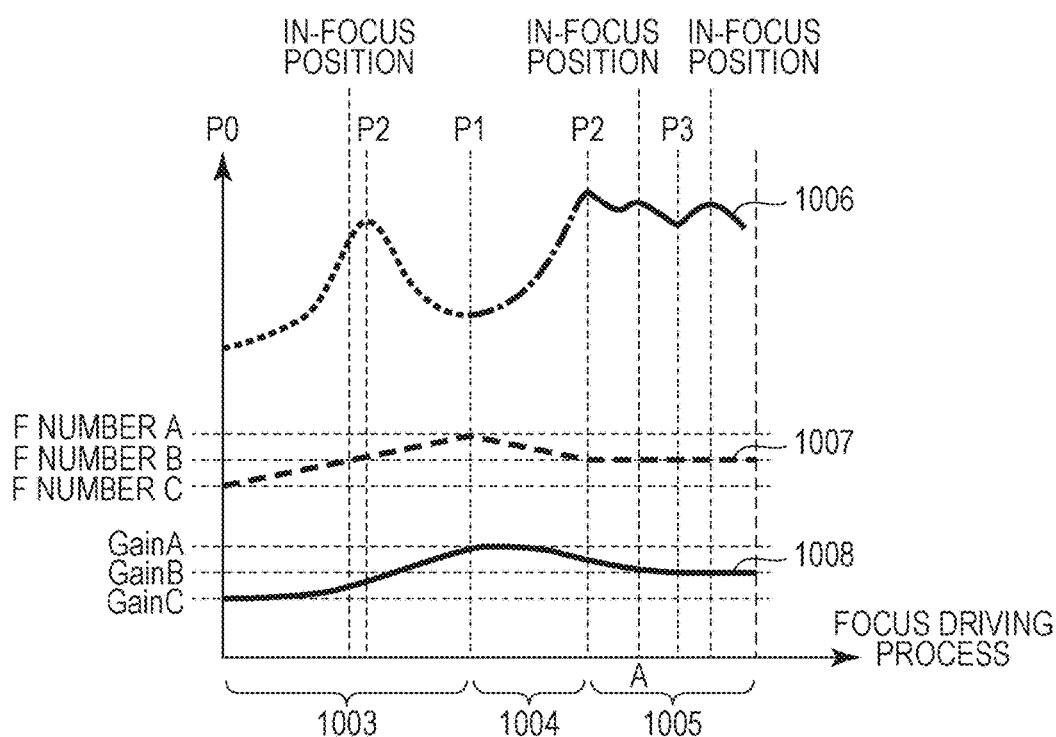
FIG. 14B is a graph illustrating transitions of the AF evaluation value, the F number, and the gain at the time of focus operation according to one or more aspects of the present disclosure.

FIG. 14B illustrates transitions of an AF evaluation value 1006, an F number 1007, and a gain 1008 in the aforementioned AF operation example. In the minute driving in step S1303, the AF evaluation value is higher in the position P2, which is a start position of the minute driving, than that in the in-focus position. The reason for this is that, since the driving for searching the in-focus position from the position P1 to the position P2 (arrow 1004) is at high speed, the gain cannot keep pace with the high-speed driving, and, in the position P2, in which the gain is supposed to be GainB, the gain value is a higher value than GainB. Thus, a peak position to be detected in the minute driving will be the position P2, and it is assumed that a problem in which the focus lens is not driven to the true in-focus position will occur.

Under such circumstances, in the present example, to reduce erroneous detection of a peak position, the peak position is detected in the minute driving with use of an AF evaluation value obtained after the gain is stable. Note that AF evaluation values may be obtained in the minute driving before the gain is stable as long as the AF evaluation values are not used for detection of a peak position. A specific flow thereof will be described below.

Figure 15A:
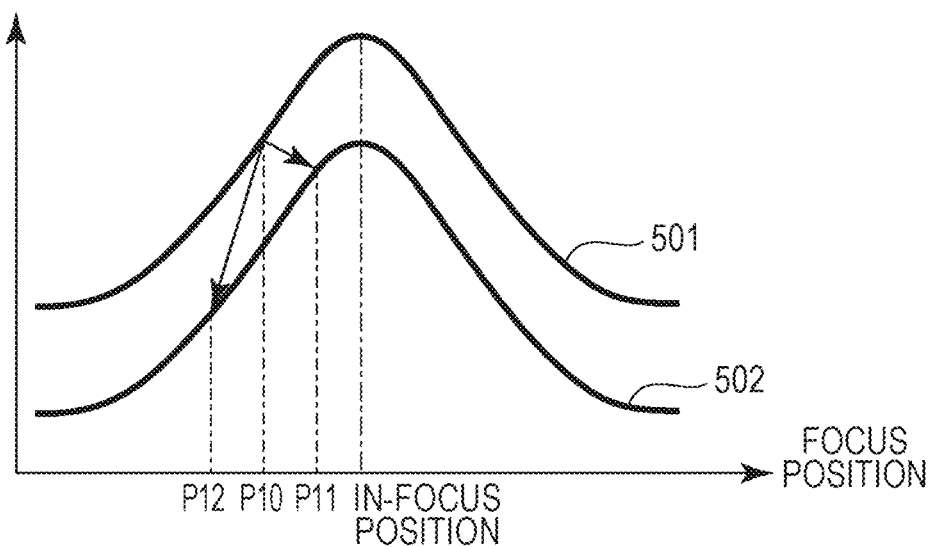
FIG. 15A is a graph illustrating transition of the AF evaluation value when the focus position is moved according to one or more aspects of the present disclosure.
Figure 15B:
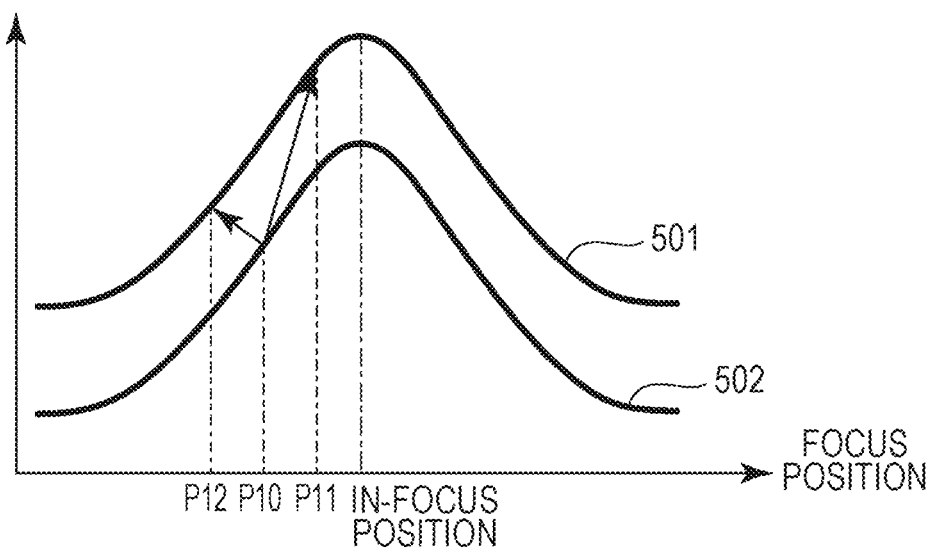
FIG. 15B is a graph illustrating transition of the AF evaluation value when the focus position is moved according to one or more aspects of the present disclosure.

Next, with reference to FIGS. 15A and 15B, a moving direction at the time of moving the focus position for searching the in-focus position will be described. A way of thinking for determining the driving direction in driving for searching the focus position is that the focus lens is heading for the in-focus position when the moving direction is a direction in which the AF evaluation value increases while the focus lens is away from the in-focus position when the moving direction is a direction in which the AF evaluation value decreases. However, gain changes may cause an error in determining the driving direction for searching the focus position. FIGS. 15A and 15B illustrate such a case.

FIGS. 15A and 15B illustrate an AF evaluation value 501 when the gain value is fixed to GainA and an AF evaluation value 502 when the gain value is fixed to GainB. Note that GainA>GainB as described above. FIG. 15A illustrates transition of the AF evaluation value when the focus position is moved by one step from a position P10 in a state in which the gain is decreasing from GainA to GainB. At this time, even when the focus position is moved to a position P11 in a direction of heading for the in-focus position, the AF evaluation value decreases due to the decrease of the gain. Thus, the optical control unit 114 determines that the focus position has been moved in a direction away from the in-focus position and reverses the moving direction. Also, FIG. 15B illustrates transition of the AF evaluation value when the focus position is moved by one step from the position P10 in a state in which the gain is increasing from GainB to GainA. At this time, even when the focus position is moved to a position P12 in a direction away from the in-focus position, the AF evaluation value increases. Thus, the optical control unit 114 determines that the focus position has been moved in a direction of heading for the in-focus position and does not reverse the moving direction. In this manner, in a case in which the moving direction for searching the focus position cannot be determined correctly, the focus position may be searched while the focus lens is driven in a reverse direction of the correct moving direction, which may require time for focus adjustment.

In the present example, to reduce erroneous determination for the moving direction for searching the in-focus position, a process for changing a threshold value for reversing the moving direction based on the gain and the changing amount of the gain is performed. A specific flow will be described below.

In the present example, by performing the AF operation in consideration of the above, the image capturing apparatus enabling prompt and accurate focus adjustment even under the low light intensity environment under which the gain is multiplied much can be provided.

The AF operation according to the present example will be described with use of flowcharts in FIGS. 9 and 10.

Figure 9:
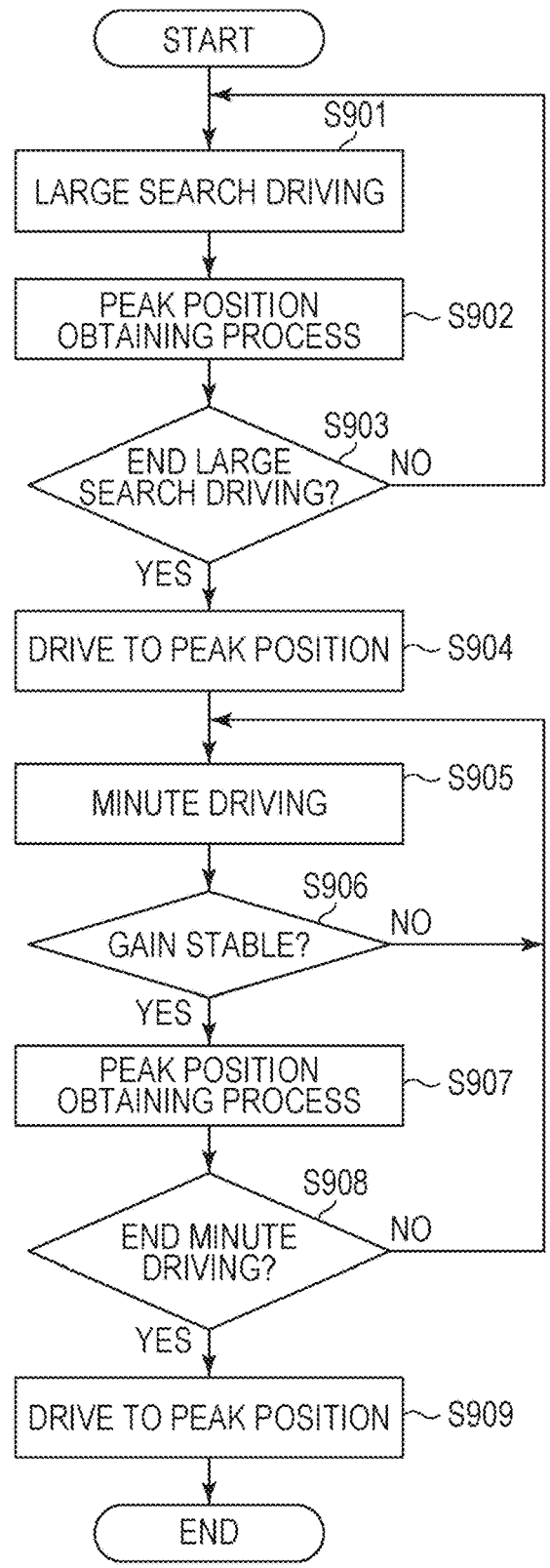
FIG. 9 illustrates an AF main process according to Example 3.

FIG. 9 is a flowchart illustrating a main process of the AF operation according to the present example.

In the present example, in step S901, large search driving is first performed, and in step S902, a peak position obtaining process during the large search driving is performed. The peak position obtaining process is a process in which a focus position (that is, a peak position) when the AF evaluation value is the maximum is detected with use of the AF evaluation values obtained. For example, a plurality of focus positions and AF evaluation values based on image signals obtained in the focus positions are made to correspond to each other and are temporarily stored, and from among them, a focus position corresponding to the highest AF evaluation value can be detected as a peak position. Alternatively, as in the flow in Example 1, the tentative AF evaluation value and the tentative peak position may be updated to detect a peak position.

In step S903, determination of whether or not the large search driving is ended is performed. An example of a determination method is a method in which the large search driving is ended when the degree of in-focus is a predetermined degree or higher. Since, based on the contrast state, the degree of in-focus (the degree of displacement between the in-focus position and the focus position) can be estimated depending on how high AF evaluation value is detected, this method utilizes the possibility of estimation of whether or not the in-focus position exists around a position from which an AF evaluation value has been obtained in the large search. This estimation can be performed by an in-focus determining unit configured to derive a degree of in-focus based on output of the focus signal. However, under the low light intensity environment under which the gain is high, and in which noises increase, the estimation accuracy is lowered. Accordingly, as in Example 1, a determination method in which the large search driving is ended when the number of times of reversal of the moving direction reaches a predetermined number of times or more, and a determination method in which the large search driving is ended when the focus lens has been driven in a predetermined focusing range, can be employed.

When the large search driving is ended, in step S904, the focus lens is driven to the peak position obtained in the large search driving, and in step S905, minute driving is then performed. Subsequently, in step S906, it is determined by the stability determining unit whether or not the gain is stable. Whether or not the gain is stable can be determined by determination of whether or not the changing range of the gain within a predetermined period of time is within a predetermined range, by determination of whether or not a predetermined period of time has passed since the start of the minute driving, or the like. In a case of using the former method, the predetermined period of time is set as a cycle of obtaining the gain, and the predetermined range is set as a minimum unit for determining whether or not the gain changes. By doing so, it can be determined whether or not the gain is being changed.

In a case in which the gain is stable, the peak position obtaining process is performed in step S907. In a case in which the gain is not stable, the peak position obtaining process is not performed. The reason for this is that, as described with reference to FIGS. 14A and 14B, in a case in which the peak position obtaining process is performed in a state in which the gain is not stable, an erroneous peak position may be detected. Also, the AF evaluation value to be used in the peak position obtaining process in step S907 is an AF evaluation value obtained after the gain is stable (an AF evaluation value obtained at the time the focus position is the in-focus position for the second time (the time the driving process reaches A) in FIG. 14B or thereafter).

In step S908, determination of whether or not the minute driving is ended is performed. Similarly to the method for determining whether or not the large search driving is ended, examples of a determination method are a method using the degree of in-focus estimated from the AF evaluation value, a method using the number of times of reversal of the moving direction, and a method based on whether or not driving in a predetermined focusing range is ended.

When the minute driving is ended, in step S909, the focus lens is driven to the peak position obtained in the minute driving, and the AF operation is ended.

Meanwhile, even in a case in which the determination of whether or not the gain is stable (S906) is performed before the minute driving (S905), detection of the peak position with use of the AF evaluation value obtained after the gain is stable can be performed. However, starting the minute driving before the gain is stable is preferable since the AF evaluation value obtained directly after the gain is stable can be used for detection of the peak position, and time required for the AF operation can thus be shortened.

Figure 10:
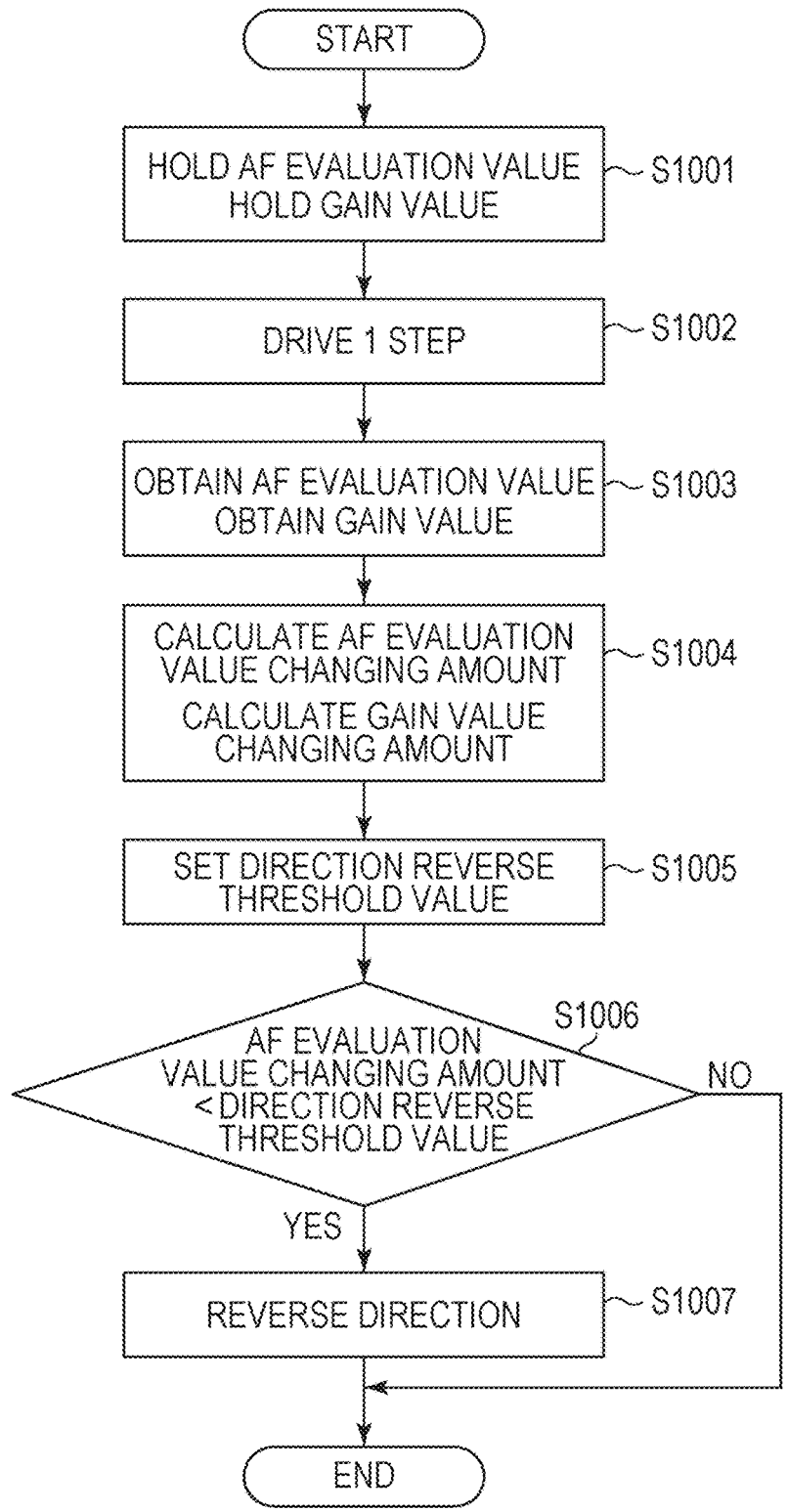
FIG. 10 illustrates a focus direction determining process according to Example 3.

FIG. 10 is a flowchart of a direction determining process that the optical control unit 114 performs at the time of driving for searching the in-focus position (S901 and S905). First, in step S1001, an AF evaluation value and a gain value before the driving for searching the in-focus position are held, and in step S1002, the focus position is moved by one step. Thereafter, in step S1003, an AF evaluation value and a gain value after the driving for searching the in-focus position are obtained, and in step S1004, the changing amounts of the AF evaluation values and the gain values before and after the driving for searching the in-focus position are respectively calculated. Each changing amount is calculated by the difference. Subsequently, in step S1005, based on the gain value changing amount, a threshold value to be used when whether or not the moving direction will be reversed is determined (hereinbelow, a direction reverse threshold value) is changed. The threshold value is set so that a threshold value when the gain is increasing (the gain changing amount is positive) may be lower than a threshold value when the gain is decreasing (the gain changing amount is negative). For example, the direction reverse threshold value can be set to a value derived from the following equation.

Direction reverse threshold value=Predetermined value+(Correction coefficient α×Gain changing amount)

Also, a higher gain value has a greater influence on the AF evaluation value than a lower gain value when the values have the same gain changing amounts. Thus, the correction coefficient α is preferably set to be higher as the gain value is higher.

Finally, it is determined in step S1006 whether or not the AF evaluation value changing amount is lower than the corrected direction reverse threshold value. In a case in which the AF evaluation value changing amount is lower than the corrected direction reverse threshold value, the moving direction is reversed in step S1007, and the process is ended. Note that the AF evaluation value changing amount is a value derived by subtracting the AF evaluation value obtained the present time from the AF evaluation value obtained the previous time, and that the changing amount is negative when the AF evaluation value decreases. Also, when the direction reverse threshold value is a negative value, and when the AF evaluation value changing amount is lower than the direction reverse threshold value, this means that the AF evaluation value is equal to or lower than an absolute value of the direction reverse threshold value. Meanwhile, when the direction reverse threshold value is a positive value, whether or not the AF evaluation value is equal to or lower than the direction reverse threshold value has only to be determined.

In the present example, whether or not the gain is stable is determined regardless of the magnitude of the gain. However, when the gain is not a high gain, the gain changes have a small influence on detection of the peak position. Thus, step S906 may be skipped when the gain is less than a threshold value, or the process may move to step S907 even when it is determined that the gain is not stable.

EXAMPLE 4

The present example is an example according to the second embodiment. In Example 3, the peak position is detected with use of the AF evaluation value obtained while the gain is stable (that is, during a period after it is determined that the gain is stable and before it is determined that the gain is unstable). The present example differs from Example 3 in that the peak position is detected in the minute driving without determining whether or not the gain is currently stable once the gain becomes stable.

Figure 11:
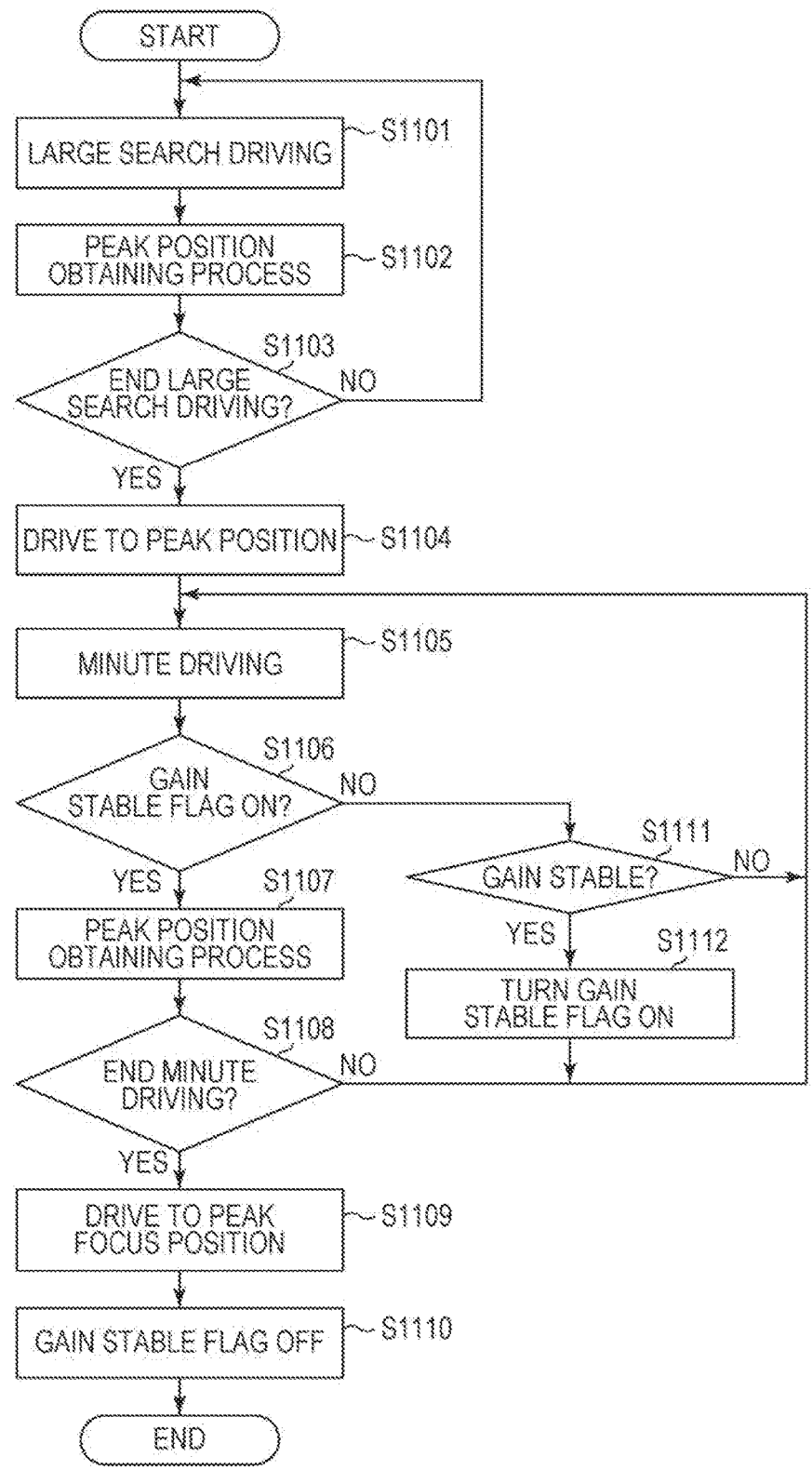
FIG. 11 illustrates an AF main process according to Example 4.

A main process of the AF operation according to the present example will be described with reference to a flowchart in FIG. 11. Description of similar steps to those in Example 3 will be omitted.

Description of steps S1101 to S1105 will be omitted since these steps are similar to steps S901 to S905 in Example 3.

In step S1106, a gain stable flag is checked. The gain stable flag is a flag used to determine whether or not the gain once becomes stable during the minute driving. In a case in which the gain stable flag is ON, the procedure moves to step S1107, and the peak position obtaining process in the minute driving is performed. Conversely, in a case in which the gain stable flag is not ON (is OFF), the procedure moves to step S1111, and it is determined whether the gain is stable (similar to step S906 in Example 3). In a case in which the gain is stable, the procedure moves to step S1112, and the gain stable flag is turned ON.

Steps S1108 and S1109 are similar to steps S908 and S909 in Example 3.

Finally, in step S1110, the gain stable flag is turned OFF, and the AF operation is ended.

In Example 3, since the peak position obtaining process is performed only when the gain is stable, erroneous determination of the peak position can be reduced. However, in a case in which a state in which the gain is stable and a state in which the gain is unstable are repeated, the peak position will be kept undetected in the minute driving, and the AF operation will not be ended. On the other hand, in the present example, once the gain becomes stable, the peak position obtaining process is performed in the minute driving even when the gain thereafter becomes unstable. Thus, the AF operation will not be endless. Also, in the minute driving, since the focus lens will be less likely to move significantly to cause the gain to change, erroneous determination of the peak position will rarely occur once the gain becomes stable.

EXAMPLE 5

In the present example, an image capturing apparatus according to the first and second embodiments will be described. By combining the respective configurations of the first and second embodiments, further performance improvement is aimed.

Figure 12:
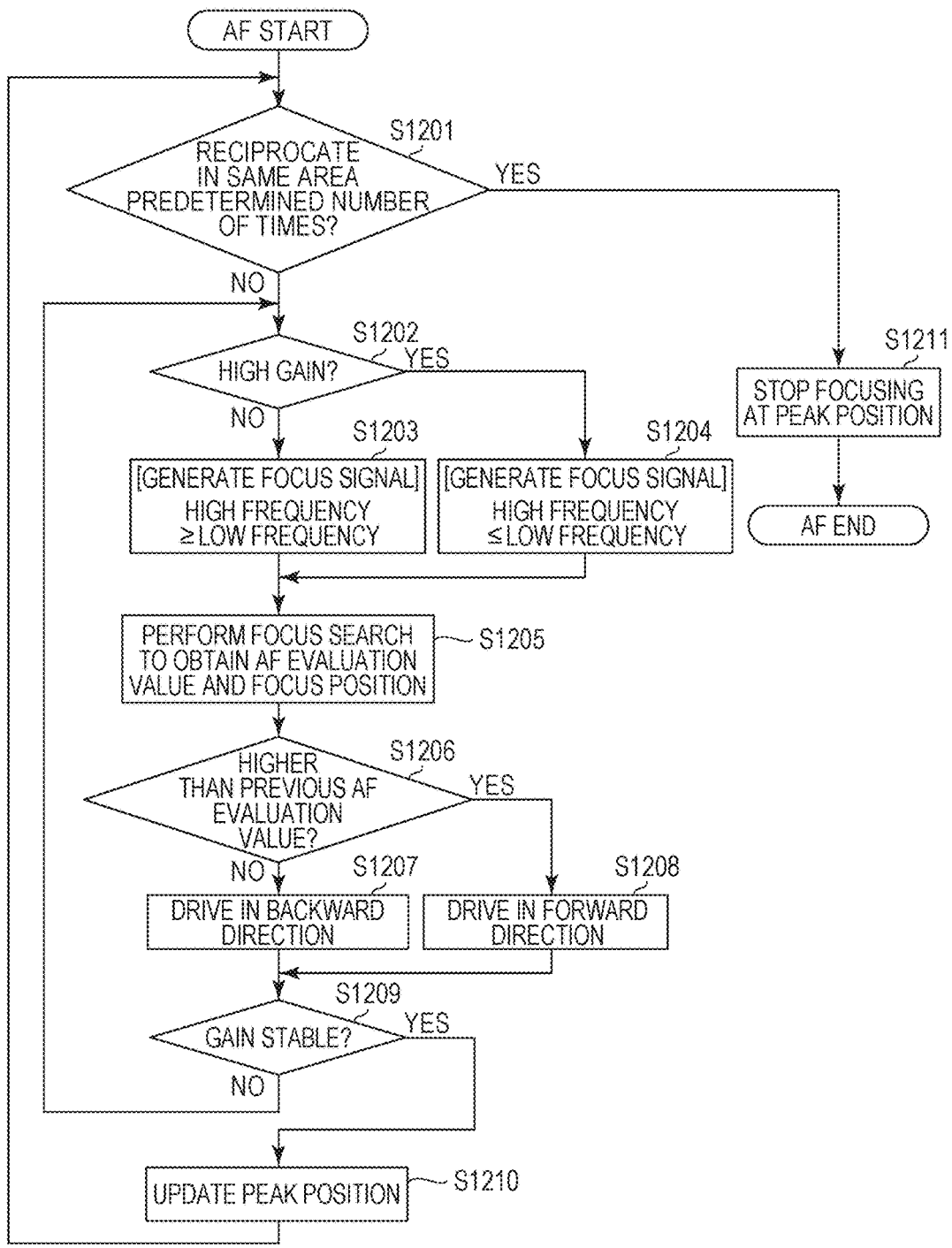
FIG. 12 illustrates an AF process according to Example 5.

FIG. 12 illustrates a flowchart of the AF operation according to the present example, and description thereof will be provided. Description of steps S1201 to S1208 will be omitted since these steps are similar to steps S401 to S408 in Example 1.

Subsequently, it is determined in step S1209 whether or not the gain for adjusting brightness is stable. In a case in which it is determined that the gain is not stable, the procedure returns to step S1202, and the subsequent steps are performed in the flow. This may lead to the possibility of obtaining AF evaluation values in the same focus positions and with different gain values. The AF evaluation values with the respective gain values may be stored, or the AF evaluation value obtained before may be replaced with the AF evaluation value obtained newly. In any case, AF evaluation values are preferably stored to correspond to gain values when the AF evaluation values are obtained.

Conversely, in a case in which the gain is stable, the procedure moves to step S1210, the peak position is updated, and the procedure returns to step S1201. Thereafter, in a case in which it has been determined in step S1201 that the focus lens stays in the same area a predetermined number of times, the procedure moves to step S1211, and the focus lens is driven to the peak position of the positions obtained during the focus search to complete a sequence of operations.

In the present example as well as in Example 1, the case in which the ratio of frequency components to be used is changed in accordance with the gain (steps S1202 to S1204) has been described. However, a similar effect can be achieved not only by changing the ratio of frequency components but also by changing a frequency band itself to be used. In this case, similarly to the above case of changing the ratio, a lower frequency band is preferably used as the gain is higher. Also, in a case in which the AF evaluation value is generated with use of a single frequency band, the signal in the frequency band may be converted into a signal in a lower frequency band.

Further, similarly to step S409 in Example 1, in step S1211 in FIG. 12, a peak position may be detected again with use of the AF evaluation value signal having a higher frequency component than that when the focus search operation is performed in step S1205 or the AF evaluation value signal in which the ratio of the high frequency component is high. Also, finer focusing driving than that at the time of the focus search operation may be performed to detect a peak position again. In a case in which a peak position is detected again in step S1211 in this manner, the driving in step S1211 corresponds to the minute driving in Examples 3 and 4 (steps S905 to S909 in Example 3), and the driving in steps S1205 to S1210 corresponds to the large search driving in Examples 3 and 4. In the case, in the large search driving, the peak position is updated when the gain is stable and is not updated when the gain is not stable. Thus, focus detection accuracy in the large search can be improved further than in a case of not performing step S1209. Also, since the peak position is detected in the minute driving, which is performed once the gain becomes stable, detection accuracy of the peak position in the minute driving can also be improved. On the other hand, steps S1205 to S1210 can correspond to the minute driving. In this case, whether the gain is stable (step S1209) is performed at the time of peak detection in the minute driving. Thus, detection accuracy of the peak position in the minute driving can be improved. Also, whether the gain is stable may be determined both in the large search and in the minute driving. In this case, step S1211 may be replaced with steps S905 to S909 in Example 3.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2016-075988, filed Apr. 5, 2016, and Japanese Patent Application No. 2017-017019, filed Feb. 1, 2017, which are hereby incorporated by reference herein in their entirety.

What is claimed is:

1. An image capturing apparatus comprising:
   one or more processors; and
   at least one memory coupled to the one or more processors and storing instructions that, when executed by the one or more processors, cause the image capturing apparatus to function as:
   an image capturing unit configured to capture an image focused on a light receiving surface;
   a gain unit configured to multiply a gain to an image signal output from the image capturing unit and be able to electronically change brightness of an image that the image signal output represents; and
   a focus signal generating unit configured to extract a signal in a frequency band from the image signal output from the gain unit and generate a focus signal from the extracted signal,
   wherein the focus signal generating unit changes the frequency band for the signal to be used in generating the focus signal in accordance with magnitude of the gain,
   wherein the focus signal generating unit changes the frequency band for the signal to be used in generating the focus signal by extracting from output of the gain unit a signal in a first frequency band and a signal in a second frequency band, which is a higher frequency band than the first frequency band, generating the focus signal from a synthesis signal obtained by synthesizing the signal in the first frequency band with the signal in the second frequency band, and changing a ratio of the signal in the first frequency band and the signal in the second frequency band in the synthesis signal,
   wherein the focus signal generating unit sets a ratio of the signal in the first frequency band in the synthesis signal to be higher as the gain is higher.

2. The image capturing apparatus according to claim 1, comprising: an in-focus determining unit configured to derive a degree of in-focus based on output of the focus signal,
   wherein the in-focus determining unit includes:
   a first in-focus unit configured to derive an in-focus position neighborhood; and
   a second in-focus unit configured to derive an in-focus stop position.

3. The image capturing apparatus according to claim 2, wherein the in-focus determining unit determines the degree of in-focus based on a contrast value derived from the image and the focus signal.

4. The image capturing apparatus according to claim 2, wherein a focus signal to be used in the second in-focus unit is generated, using higher frequency than frequency that is used to generate a focus signal to be used in the first in-focus unit.

5. The image capturing apparatus according to claim 1, further comprising:
   a peak position detecting unit configured to detect a peak of the focus signal with use of a plurality of focus signals generated by the focus signal generating unit; and
   a gain stability determining unit configured to determine whether or not the gain is stable,
   wherein the focus signal generating unit generates the plurality of focus signals by generating the focus signals respectively corresponding to a plurality of focus positions, and
   wherein the peak position detecting unit detects the peak of the focus signal with use of the focus signal generated with use of the image signal determined as the image signal output from the gain unit after the gain is stable based on a determination result of the gain stability determining unit.

* * * * *